US011921484B1

United States Patent
Croyle et al.

(10) Patent No.: US 11,921,484 B1
(45) Date of Patent: Mar. 5, 2024

(54) SAFETY RATED ROBOTIC MOTOR CONTROL

(71) Applicant: Amazon Technologies, Inc., Seattle, WA (US)

(72) Inventors: Justin Croyle, Hampstead, NH (US); Sean Garcen, Hudson, MA (US); Craig Ropi, Medford, MA (US); Joshua Zarr, Nashua, NH (US)

(73) Assignee: Amazon Technologies, Inc., Seattle, WA (US)

( * ) Notice: Subject to any disclaimer, the term of this patent is extended or adjusted under 35 U.S.C. 154(b) by 721 days.

(21) Appl. No.: 16/934,544

(22) Filed: Jul. 21, 2020

(51) Int. Cl.
*G05B 19/042* (2006.01)
*B25J 5/00* (2006.01)
*B25J 9/12* (2006.01)

(52) U.S. Cl.
CPC .......... *G05B 19/0428* (2013.01); *B25J 5/007* (2013.01); *B25J 9/12* (2013.01)

(58) Field of Classification Search
CPC ...... G05B 19/0428; G05B 2219/34435; G05B 2219/41398; G05B 2219/25268; G05B 2219/13109; G05B 19/41895; G05B 2219/50393; G05B 19/058; B25J 5/007; B25J 9/162; B25J 9/161; B25J 5/02; G05D 1/0297; G05D 1/0027; G05D 1/0291; G05D 1/0055; G05D 2201/0216
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 2004/0128042 A1* | 7/2004 | Takahashi | B62D 5/0403 180/443 |
| 2016/0241173 A1* | 8/2016 | Prüssmeier | H02P 6/006 |
| 2018/0215409 A1* | 8/2018 | Pramod | B62D 15/0235 |
| 2018/0229761 A1* | 8/2018 | Fujita | H02P 6/16 |
| 2018/0275645 A1* | 9/2018 | Matsumura | G01D 5/24461 |
| 2019/0176323 A1* | 6/2019 | Coady | A61B 5/24 |
| 2019/0190422 A1* | 6/2019 | Ghaderi | B62D 5/04 |
| 2020/0290205 A1* | 9/2020 | Hammes | B25J 9/1674 |
| 2020/0391386 A1* | 12/2020 | Verma | B60W 30/095 |
| 2022/0018687 A1* | 1/2022 | Cosgrave | G01D 3/08 |

FOREIGN PATENT DOCUMENTS

WO WO-2021023746 A1 * 2/2021 .............. B60L 15/20

* cited by examiner

*Primary Examiner* — Khoi H Tran
*Assistant Examiner* — Tanner L Cullen
(74) *Attorney, Agent, or Firm* — Kilpatrick Townsend & Stockton LLP

(57) ABSTRACT

A safety rated robotic motor control system may be configured to receive sensor data from sensors positioned on a motor. The data can be received by a programmable logic device and processed to generate a fault message based on a first set of characteristics. The fault message and the data can be transmitted to a safety controller that determines a second set of characteristics and generates operating instructions based on the fault message and the second set of characteristics.

19 Claims, 5 Drawing Sheets

SAFETY RATED ROBOTIC MOTOR CONTROL

BACKGROUND

Modern inventory systems, such as those in mail order warehouses, supply chain distribution centers, airport luggage systems, and custom-order manufacturing facilities, face significant challenges in responding to requests for inventory items. In some existing approaches, the items may be moved around the storage area using one or more robotic devices that work in conjunction with operators. As a result, the robotic devices may need one or more safety systems to ensure safe operation while interacting with the operators and while moving around the storage area.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, techniques for using a safety rated robotic motor control system. In particular, the techniques can relate to a safety rated robotic motor control system using non-diverse, non-safety rated sensors. For example, in some embodiments, instead of using two safety sensors that can be expensive and limited in availability, two identical off-the-shelf, non-safety rated sensors can be used to create a safety system that can achieve safety certification (e.g., IEC 61508 and/or ISO 13849). The safety rated robotic motor control system can include one or more sensors positioned on a motor to detect data associated with the motor. One or more processors can process the data to determine faults associated with the motor and generate operating instructions based on the determined faults.

In a particular embodiment, the safety rated robotic motor control system includes sensors positioned on a motor, for example, a motor that is used to propel a mobile drive unit. The sensors detect data associated with the motor, for example, the rotation of the motor relative to the sensors. The sensors can transmit the data to a programmable logic device for processing of the data. The programmable logic device can determine a first set of motor characteristics (such as angular position of the motor) and generate a fault message based on the first set of motor characteristics (such as if the angular position readings indicate a sensor being misaligned). The fault message and sensor data can be transmitted to a safety controller for additional processing. The safety controller can determine a second set of characteristics associated with the motor (such as the speed of the motor) and generate operating instructions based on the second set of characteristics and the fault message (such as instructing that the motor stop operation if the fault message indicates the sensor is misaligned or if the determined speed of the motor based indicates the sensor is lacking a sufficiently strong magnetic field to obtain a reliable reading). The operating instructions can be transmitted to the motor to control operation of the motor.

Figure 1:
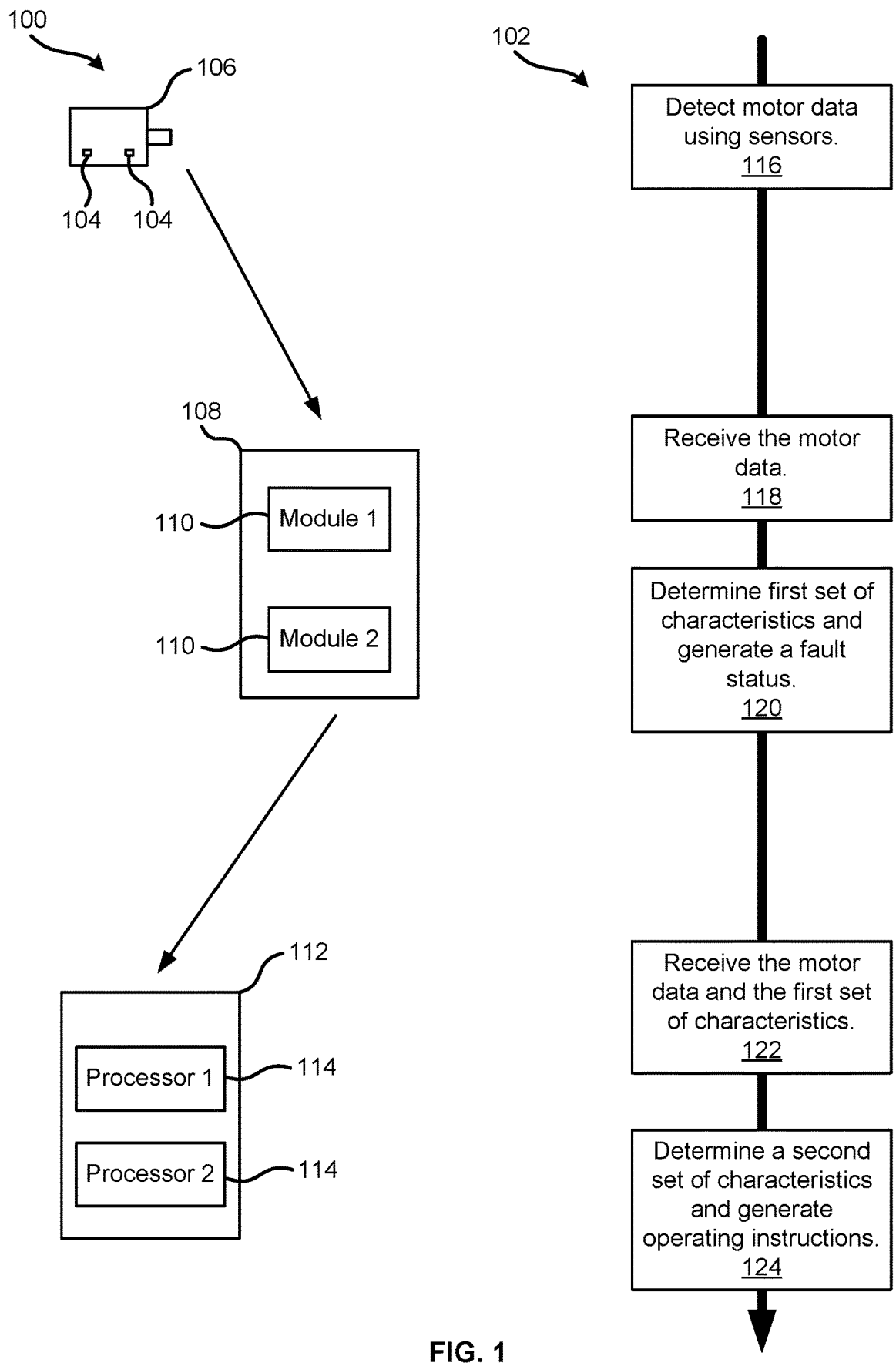
FIG. 1 illustrates an example block diagram depicting an example for implementing techniques relating to a safety rated robotic motor control system.

FIG. 1 illustrates a simplified block diagram depicting an example safety rated robotic motor (SRRM) control system 100 and associated process 102 for implementing techniques related to the SRRM control system, according to at least one embodiment. The SRRM control system 100 as depicted includes one or more sensors 104 disposed at various positions on a motor 106. The sensors 104 can be configured to measure motor data associated with the motor 106. For example, the sensors 104 can measure the rotational speed of the motor 106. The sensors 104 may be diverse and/or safety rated sensors. In various embodiments, the sensors 104 can be or include non-diverse (e.g., homogenous) and/or non-safety rated sensors that can reduce the cost and/or complexity of the SRRM control system as compared to an SRRM control system that uses diverse and/or safety rated sensors.

The sensors 104 can be in communication with a programmable logic device 108 to transmit data between the sensors 104 and the programmable logic device 108. The programmable logic device 108 can include one or more modules 110. The modules 110 can be configured to process data received from the sensors 104. For example, the modules 110 can determine a first set of motor characteristics (e.g., the angular position of a rotor of the motor 106) based on the data and generate a fault message (e.g., the two sensors 104 disagree on the angular position of the rotor of the motor) based on the first set of motor characteristics.

The programmable logic device 108 can be in communication with a safety controller 112 to transmit data between the programmable logic device 108 and the safety controller 112. In various embodiments, the programmable logic device 108 can communicate with the safety controller 112 over a black channel communication path where the data is protected regardless of the hardware and software involved in the underlying path. The data may include the data from the sensors 104 and/or the fault status. The safety controller 112 can include one or more processors 114 configured to process data received from the sensors 104 and/or the programmable logic device 108. For example, the processors 114 can determine a second set of characteristics (e.g., the phase offset between the sensors 104) and generate operating instructions (e.g., issue a safe torque off command) for the motor 106 based on the data from the sensors 104 and/or the programmable logic device 108.

The process 102 may begin at 116 by detecting motor data associated with the motor 106 using sensors 104. The sensors 104 may detect the motor data and transmit the data to the programmable logic device 108. At 118, the programmable logic device 108 can receive the motor data from the sensors 104. For example, the programmable logic device 108 may receive the motor data via a wired and/or a wireless connection with the sensors 104. At 120, the programmable logic device 108 can, using the motor data, determine a first set of characteristics and generate a fault status based on the first set of characteristics. For example, the modules 110 can process the motor data to determine the first set of characteristics and the fault status of the motor 106.

At 122, the safety controller 112 can receive the motor data and/or the first set of characteristics from the programmable logic device 108. At 124, the safety controller 112 can, using the motor data and/or the fault status, determine a second set of characteristics and generate operating instructions. For example, the processors 114 can process the motor data to determine the second set of characteristics and generate operating instructions for the motor 106.

Figure 2:
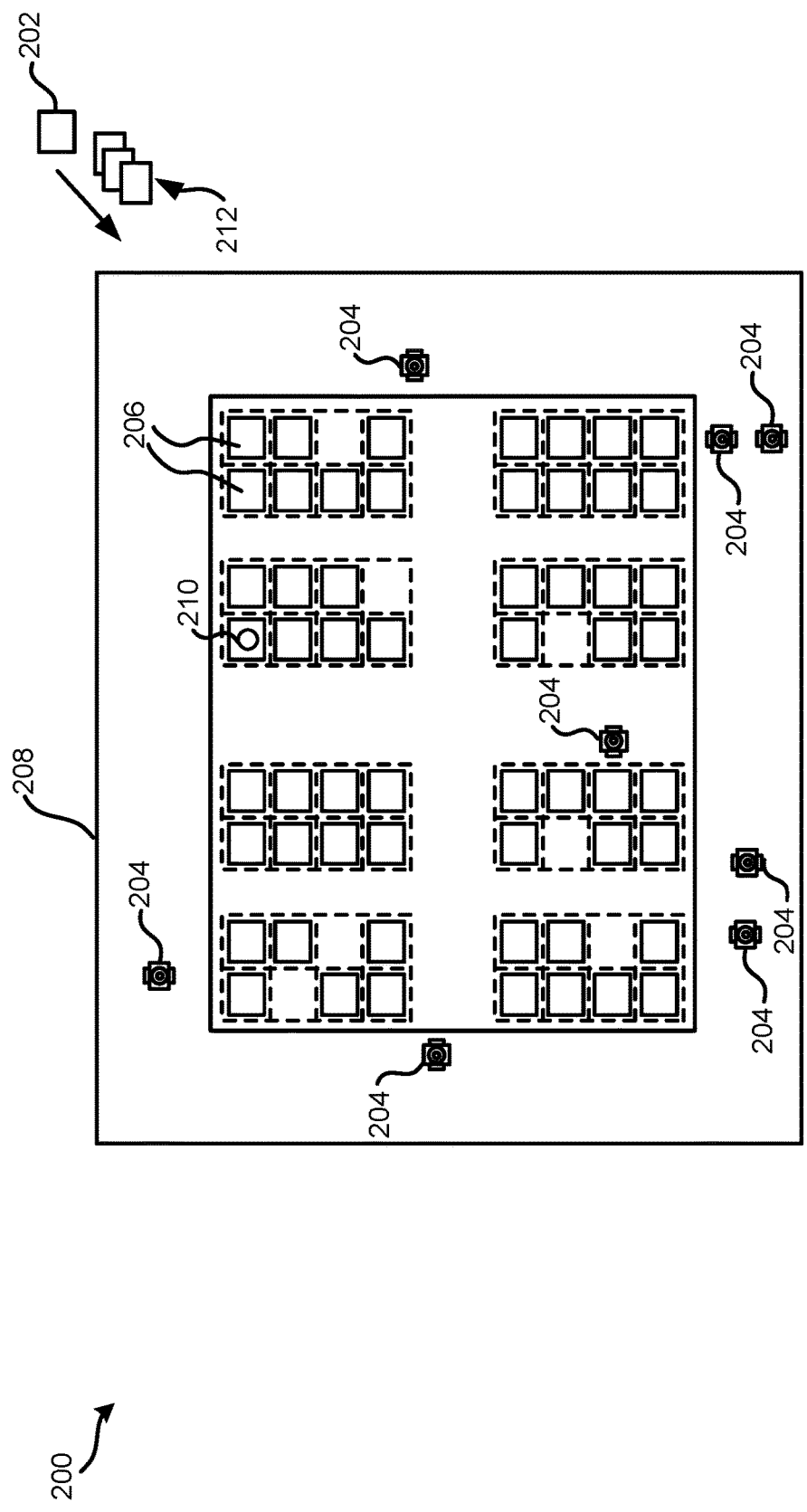
FIG. 2 illustrates an example inventory system for implementing techniques relating to the safety rated robotic motor control system of FIG. 1.

FIG. 2 illustrates an example inventory system 200 for implementing techniques relating to the safety rated robotic motor control system of FIG. 1, according to at least one embodiment. For example, the inventory system 200 can include a safety rated robotic motor (SRRM) control system that utilizes non-diverse, non-safety rated sensors. The inventory system 200 can include a management module 202, one or more mobile drive units 204, and one or more inventory holders 206 positioned in a workspace 208. The management module 202 can communicate with the mobile drive units 204 to send commands for navigating around the workspace 208. Each of the mobile drive units 204 can include one or more components that utilize the SRRM control system to aid in guiding the mobile drive units. For example, the SRRM control system can aid in guiding mobile drive units 204 that are transporting inventory holders 206 between points within the workspace 208. Each inventory holder 206 can store one or more types of inventory items. As a result, the inventory system 200 is capable of moving inventory items between locations within workspace 208 to facilitate the entry, processing, and/or removal of inventory items 210 from inventory system 200 and the completion of other tasks involving inventory items.

Management module 202 can assign tasks to appropriate components of the inventory system 200 and coordinate operation of the various components in completing the tasks. These tasks may relate not only to the movement and processing of inventory items 210, but also to the management and maintenance of the components of inventory system 200. For example, management module 202 may assign portions of workspace 208 as parking spaces for mobile drive units 204, the scheduled recharge or replacement of mobile drive unit batteries, the storage of empty inventory holders 206, or any other operations associated with the functionality supported by inventory system 200 and its various components. Management module 202 may select components of inventory system 200 to perform these tasks and communicate appropriate commands and/or data to the selected components to facilitate completion of these operations. Although shown in FIG. 2 as a single, discrete component, management module 202 may represent multiple components and may represent or include portions of mobile drive units 204 or other elements of inventory system 200. As a result, any or all of the interaction between a particular mobile drive unit 204 and management module 202 that is described below may, in particular embodiments, represent peer-to-peer communication between that mobile drive unit 204 and one or more other mobile drive units 204.

In some embodiments, one or more components of the SRRM control system may be part of the management module 202. The management module 202 may be in communication with the mobile drive units 204 to send and/or receive data associated with steering the mobile drive units 204 around the workspace 208. For example, the management module 202 may include one or more processors that can receive and process the SRRM control system data for guiding the mobile drive units 204.

Mobile drive units 204 can move inventory holders 206 between locations within workspace 208. Mobile drive units 204 may represent any devices or components appropriate for use in inventory system 200 based on the characteristics and configuration of inventory holders 206 and/or other elements of inventory system 200. In a particular embodiment of inventory system 200, mobile drive units 204 represent independent, self-powered devices configured to freely move about workspace 208. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 204 represent elements of a tracked inventory system configured to move inventory holder 206 along tracks, rails, cables, crane system, or other guidance or support elements traversing workspace 208. In such an embodiment, mobile drive units 204 may receive power and/or support through a connection to the guidance elements, such as a powered rail. Additionally, in particular embodiments of inventory system 200 mobile drive units 204 may be configured to utilize alternative conveyance equipment to move within workspace 208 and/or between separate portions of workspace 208. The contents and operation of an example embodiment of a mobile drive unit 204 are discussed further below with respect to FIGS. 3 and 4.

The mobile drive units 204 can include one or more components of the SRRM control system. The mobile drive units 204 may include components to capture and/or process data that can be used to aid in guidance of the mobile drive units 204. For example, the mobile drive units 204 may include one or more of the sensors 104, motor 106, programmable logic device 108, and/or the safety controller 112. In various embodiments, each of the mobile drive units 204 may include all of the components that make up the SRRM control system (i.e., the SRRM control system is self-contained on a single mobile drive unit 204). However, multiple mobile drive units 204 may have various components that are part of the same SRRM control system (i.e., multiple mobile drive units 204 work together as part of the same SRRM control system).

Mobile drive units 204 may be capable of communicating with management module 202 to receive information identifying selected inventory holders 206, transmit the locations of mobile drive units 204, or exchange any other suitable information to be used by management module 202 or mobile drive units 204 during operation. Mobile drive units 204 may communicate with management module 202 and/or with one another using wireless protocols, wired connections, and/or in any other appropriate manner. As one example, particular embodiments of mobile drive unit 204 may communicate with management module 202 and/or with one another using 802.11, Bluetooth, or Infrared Data Association (IrDA) standards, or any other appropriate wireless communication protocol. As another example, in a tracked inventory system 200, tracks or other guidance elements upon which mobile drive units 204 move may be wired to facilitate communication between mobile drive units 204 and other components of inventory system 200. Furthermore, as noted above, management module 202 may include components of individual mobile drive units 204. Thus, for the purposes of this description and the claims that follow, communication between management module 202 and a particular mobile drive unit 204 may represent communication between components of a particular mobile drive unit 204. In general, mobile drive units 204 may be powered, propelled, and controlled in any manner appropriate based on the configuration and characteristics of inventory system 200.

Inventory holders 206 can contain one or more inventory items 210. In a particular embodiment, inventory holders 206 include multiple storage bins with each storage bin capable of holding one or more types of inventory items 210. Inventory holders 206 are capable of being carried, rolled, and/or otherwise moved by mobile drive units 204. In particular embodiments, inventory holder 206 may provide additional propulsion to supplement that provided by mobile drive unit 204 when moving inventory holder 206.

Additionally, in particular embodiments, inventory items 210 may also hang from hooks or bars (not shown) within or on inventory holder 206. In general, inventory holder 206 may store inventory items 210 in any appropriate manner within inventory holder 206 and/or on the external surface of inventory holder 206.

Additionally, each inventory holder 206 may include a plurality of faces, and each bin may be accessible through one or more faces of the inventory holder 206. For example, in a particular embodiment, inventory holder 206 includes four faces. In such an embodiment, bins located at a corner of two faces may be accessible through either of those two faces, while each of the other bins is accessible through an opening in one of the four faces. Mobile drive unit 204 may be configured to rotate inventory holder 206 at appropriate times to present a particular face and the bins associated with that face to an operator or other components of inventory system 200.

Inventory items 210 represent any objects suitable for storage, retrieval, and/or processing in an automated inventory system 200. For the purposes of this description, "inventory items" may represent any one or more objects of a particular type that are stored in inventory system 200. Thus, a particular inventory holder 206 may be said to currently "contain" a particular inventory item 210 if the inventory holder 206 currently holds one or more units of that type. As one example, inventory system 200 may represent a sortation center, and inventory items may represent merchandise sorted and/or stored in the sortation center. During operation, mobile drive units 204 may retrieve inventory holders 206 containing one or more inventory items 210 requested in an order to be sorted and/or packed for delivery to a customer or inventory holders 206 carrying pallets containing aggregated collections of inventory items for shipment. Moreover, in particular embodiments of inventory system 200, boxes containing completed orders may themselves represent inventory items.

Workspace 208 represents an area associated with inventory system 200 in which mobile drive units 204 can move and/or inventory holders 206 can be stored. For example, workspace 208 may represent all or part of a sortation center in which inventory system 200 operates. Workspace 208 can additionally or alternatively represent a mail order warehouse, a fulfillment center, and/or other facilities in which mobile drive units 204 can operate. Workspace 208 can include a fixed, predetermined, and finite physical space, however, particular embodiments of the inventory system 200 may include mobile drive units 204 and inventory holders 206 that are configured to operate within a workspace 208 that is of variable dimensions and/or an arbitrary geometry. In some embodiments, workspace 208 may be entirely enclosed in a building, however, some or all of the workspace 208 may be located outdoors, within a vehicle (such as a cargo ship), or otherwise unconstrained by any fixed structure.

In operation, management module 202 selects appropriate components to complete particular tasks and transmits task assignments 212 to the selected components to trigger completion of the relevant tasks. Each task assignment 212 defines one or more tasks to be completed by a particular component. These tasks may relate to the sorting, retrieval, storage, replenishment, and counting of inventory items and/or the management of mobile drive units 204, inventory holders 206, and/or other components of inventory system 200. Depending on the component and the task to be completed, a particular task assignment 212 may identify locations, components, and/or actions associated with the corresponding task and/or any other appropriate information to be used by the relevant component in completing the assigned task.

In particular embodiments, management module 202 generates task assignments 212 based, in part, on inventory requests that management module 202 receives from other components of inventory system 200 and/or from external components in communication with management module 202. These inventory requests identify particular operations to be completed involving inventory items stored or to be stored within inventory system 200 and may represent communication of any suitable form. For example, in particular embodiments, an inventory request may represent a shipping order specifying particular inventory items that have been purchased by a customer and that are to be retrieved from inventory system 200 for shipment to the customer. Management module 202 may also generate task assignments 212 independently of such inventory requests, as part of the overall management and maintenance of inventory system 200. For example, management module 202 may generate task assignments 212 in response to the occurrence of a particular event (e.g., in response to a mobile drive unit 204 requesting a space to park), according to a predetermined schedule (e.g., as part of a daily start-up routine), or at any appropriate time based on the configuration and characteristics of inventory system 200. After generating one or more task assignments 212, management module 202 transmits the generated task assignments 212 to appropriate components for completion of the corresponding task. The relevant components then execute their assigned tasks.

With respect to mobile drive units 204 specifically, management module 202 may, in particular embodiments, communicate task assignments 212 to selected mobile drive units 204 that identify one or more destinations for the selected mobile drive units 204. Management module 202 may select a mobile drive unit 204 to assign the relevant task based on the location or state of the selected mobile drive unit 204, an indication that the selected mobile drive unit 204 has completed a previously-assigned task, a predetermined schedule, and/or any other suitable consideration. These destinations may be associated with an inventory request the management module 202 is executing or a management objective the management module 202 is attempting to fulfill. For example, the task assignment may define the location of an inventory holder 206 to be retrieved, a storage location where the mobile drive unit 204 should park until receiving another task, and/or a location associated with any other task appropriate based on the configuration, characteristics, and/or state of inventory system 200, as a whole, or individual components of inventory system 200. For example, in particular embodiments, such decisions may be based on the popularity of particular inventory items 210, the tasks currently assigned to a particular mobile drive unit 204, and/or any other appropriate considerations.

As part of completing these tasks mobile drive units 204 may dock with and transport inventory holders 206 within workspace 208. Mobile drive units 204 may dock with inventory holders 206 by connecting to, lifting, and/or otherwise interacting with inventory holders 206 in any other suitable manner so that, when docked, mobile drive units 204 are coupled to and/or support inventory holders 206 and can move inventory holders 206 within workspace 208. While the description below focuses on particular embodiments of mobile drive unit 204 and inventory holder 206 that are configured to dock in a particular manner, alternative embodiments of mobile drive unit 204 and inventory holder 206 may be configured to dock in any manner suitable to allow mobile drive unit 204 to move inventory holder 206 within workspace 208. Additionally, as noted below, in particular embodiments, mobile drive units 204 represent all or portions of inventory holders 206. In such embodiments, mobile drive units 204 may not dock with inventory holders 206 before transporting inventory holders 206 and/or mobile drive units 204 may each remain continually docked with a particular inventory holder 206.

While the appropriate components of inventory system 200 complete assigned tasks, management module 202 may interact with the relevant components to ensure the efficient use of space, equipment, manpower, and other resources available to inventory system 200. As one specific example of such interaction, management module 202 is responsible, in particular embodiments, for planning the paths mobile drive units 204 take when moving within workspace 208 and for allocating use of a particular portion of workspace 208 to a particular mobile drive unit 204 for purposes of completing an assigned task. In such embodiments, mobile drive units 204 may, in response to being assigned a task, request a path to a particular destination associated with the task. Moreover, while the description below focuses on one or more embodiments in which mobile drive unit 204 requests paths from management module 202, mobile drive unit 204 may, in alternative embodiments, generate its own paths.

Components of inventory system 200 may provide information to management module 202 regarding their current state, other components of inventory system 200 with which they are interacting, and/or other conditions relevant to the operation of inventory system 200. This may allow management module 202 to utilize feedback from the relevant components to update algorithm parameters, adjust policies, or otherwise modify its decision-making to respond to changes in operating conditions or the occurrence of particular events.

In addition, while management module 202 may be configured to manage various aspects of the operation of the components of inventory system 200, in particular embodiments, the components themselves may also be responsible for decision-making relating to certain aspects of their operation, thereby reducing the processing load on management module 202.

Thus, based on its knowledge of the location, current state, and/or other characteristics of the various components of inventory system 200 and an awareness of all the tasks currently being completed, management module 202 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 200 may be able to support a number of techniques for efficiently executing various aspects of the operation of inventory system 200. As a result, particular embodiments of management module 202 may, by implementing one or more management techniques described below, enhance the efficiency of inventory system 200 and/or provide other operational benefits.

Figure 3:
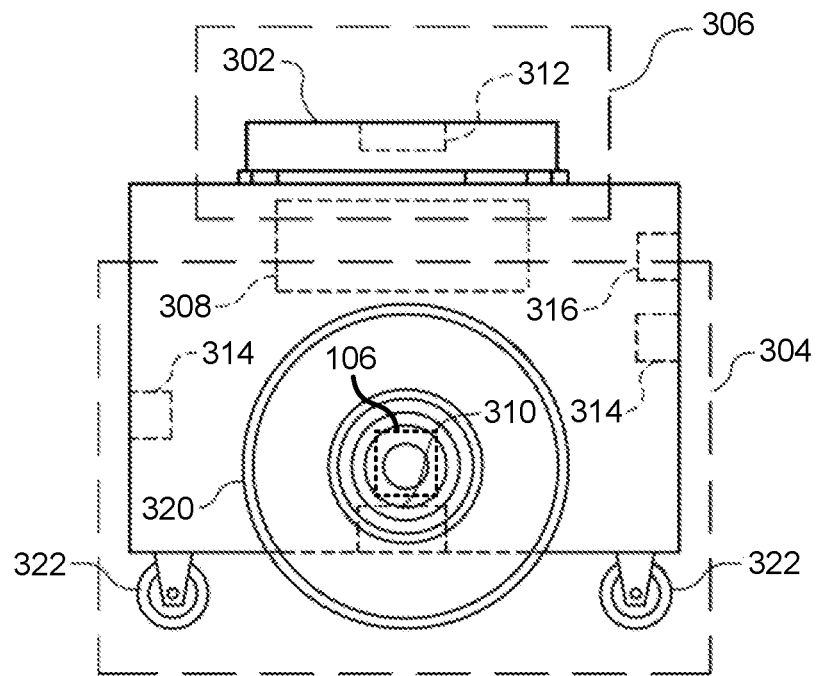
FIGS. 3 and 4 illustrate an example mobile drive unit including a safety rated robotic motor control system that may be utilized in particular embodiments of the example environment of FIG. 2.
Figure 4:
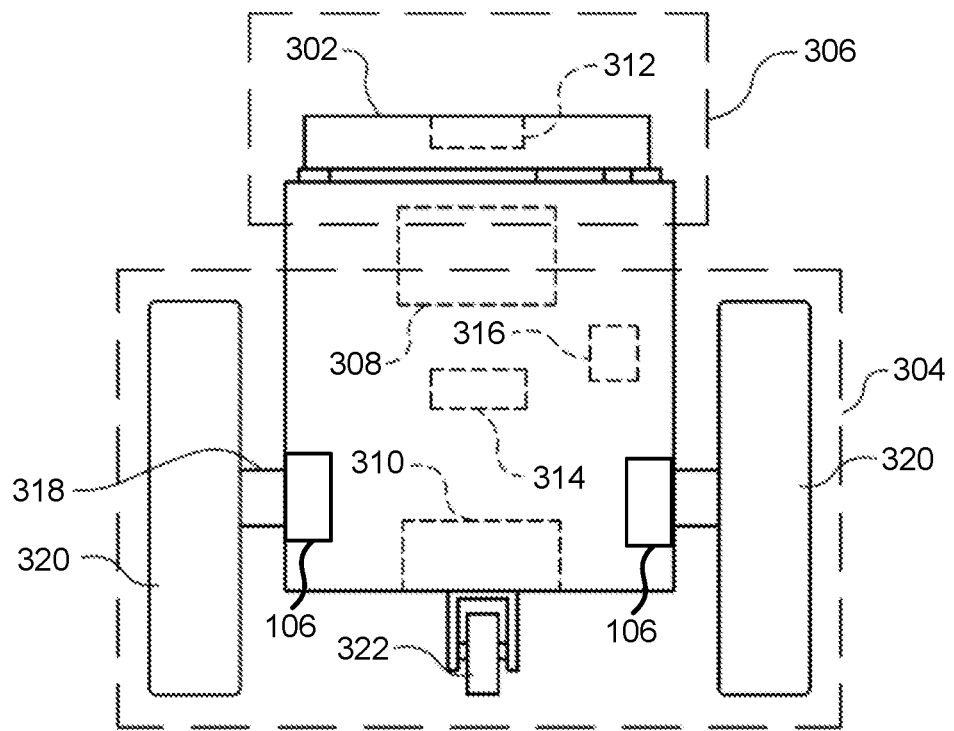

FIGS. 3 and 4 illustrate in greater detail the components of a particular embodiment of mobile drive unit 204. In particular, FIGS. 3 and 4 include a front and side view of an example mobile drive unit 204. Mobile drive unit 204 includes a docking head 302, a drive module 304, a docking actuator 306, and a control module 308. Additionally, mobile drive unit 204 may include one or more sensors configured to detect or determine the location of mobile drive unit 204, inventory holder 206, and/or other appropriate elements of inventory system 200. In the illustrated embodiment, mobile drive unit 204 includes a position sensor 310, a holder sensor 312, an obstacle sensor 314, and an identification signal transmitter 316.

While FIGS. 3 and 4 illustrate a particular embodiment of mobile drive unit 204 containing certain components and configured to operate in a particular manner, mobile drive unit 204 may represent any appropriate component and/or collection of components configured to transport and/or facilitate the transport of inventory holders 206. As another example, mobile drive unit 204 may represent part of an overhead crane system in which one or more crane assemblies are capable of moving within a network of wires or rails to a position suitable to dock with a particular inventory holder 206. After docking with inventory holder 206, the crane assembly may then lift inventory holder 206 and move inventory to another location for purposes of completing an assigned task.

Furthermore, in particular embodiments, mobile drive unit 204 may represent all or a portion of inventory holder 206. Inventory holder 206 may include motorized wheels or any other components suitable to allow inventory holder 206 to propel itself. As one specific example, a portion of inventory holder 206 may be responsive to magnetic fields. Inventory system 200 may be able to generate one or more controlled magnetic fields capable of propelling, maneuvering and/or otherwise controlling the position of inventory holder 206 as a result of the responsive portion of inventory holder 206. In such embodiments, mobile drive unit 204 may represent the responsive portion of inventory holder 206 and/or the components of inventory system 200 responsible for generating and controlling these magnetic fields. While this description provides several specific examples, mobile drive unit 204 may, in general, represent any appropriate component and/or collection of components configured to transport and/or facilitate the transport of inventory holders 206.

Docking head 302, in particular embodiments of mobile drive unit 204, couples mobile drive unit 204 to inventory holder 206 and/or supports inventory holder 206 when mobile drive unit 204 is docked to inventory holder 206.

Docking head 302 may additionally allow mobile drive unit 204 to maneuver inventory holder 206, such as by lifting inventory holder 206, propelling inventory holder 206, rotating inventory holder 206, and/or moving inventory holder 206 in any other appropriate manner. Docking head 302 may also include any appropriate combination of components, such as ribs, spikes, and/or corrugations, to facilitate such manipulation of inventory holder 206. For example, in particular embodiments, docking head 302 may include a high-friction portion that abuts a portion of inventory holder 206 while mobile drive unit 204 is docked to inventory holder 206. In such embodiments, frictional forces created between the high-friction portion of docking head 302 and a surface of inventory holder 206 may induce translational and rotational movement in inventory holder 206 when docking head 302 moves and rotates, respectively. As a result, mobile drive unit 204 may be able to manipulate inventory holder 206 by moving or rotating docking head 302, either independently or as a part of the movement of mobile drive unit 204 as a whole.

In various embodiments, docking head 302 can be a conveyor and/or motor driven rollers for moving inventory holder 206 and/or items 210. The docking head 302 can move the inventory holder 206 and/or the items 210 onto the docking head 302. With the inventory holder 206 and/or items 210 positioned on the docking head 302, the mobile drive unit 204 can maneuver around the workspace 208. The docking head 302 can offload the inventory holder 206 and/or the items 210 into a sort location. For example, the docking head 302 can offload the inventory holder 206 and/or the items 210 into a chute.

Drive module 304 propels mobile drive unit 204 and, when mobile drive unit 204 and inventory holder 206 are docked, inventory holder 206. Drive module 304 may represent any appropriate collection of components operable to propel mobile drive unit 204. In various embodiments, drive module 304 can be or include one or more motors 106. In the illustrated embodiment, drive module 304 includes motorized axle 318, a pair of motorized wheels 320, and a pair of stabilizing wheels 322. One motorized wheel 320 is located at each end of motorized axle 318, and one stabilizing wheel 322 is positioned at each end of mobile drive unit 204.

Docking actuator 306 moves docking head 302 towards inventory holder 206 to facilitate docking of mobile drive unit 204 and inventory holder 206. Docking actuator 306 may also be capable of adjusting the position or orientation of docking head 302 in other suitable manners to facilitate docking. Docking actuator 306 may include any appropriate components, based on the configuration of mobile drive unit 204 and inventory holder 206, for moving docking head 302 or otherwise adjusting the position or orientation of docking head 302. For example, in the illustrated embodiment, docking actuator 306 includes a motorized shaft (not shown) attached to the center of docking head 302. The motorized shaft is operable to lift docking head 302 as appropriate for docking with inventory holder 206.

Drive module 304 may be configured to propel mobile drive unit 204 in any appropriate manner. For example, in the illustrated embodiment, motorized wheels 320 are operable to rotate in a first direction to propel mobile drive unit 204 in a forward direction. Motorized wheels 320 are also operable to rotate in a second direction to propel mobile drive unit 204 in a backward direction. In the illustrated embodiment, drive module 304 is also configured to rotate mobile drive unit 204 by rotating motorized wheels 320 in different directions from one another or by rotating motorized wheels 320 at different speeds from one another.

Position sensor 310 represents one or more sensors, detectors, or other components suitable for determining the location of mobile drive unit 204 in any appropriate manner. For example, in particular embodiments, the workspace 208 associated with inventory system 200 includes a number of fiducial marks that mark points on a two-dimensional grid that covers all or a portion of workspace 208. In such embodiments, position sensor 310 may include a camera and suitable image- and/or video-processing components, such as an appropriately-programmed digital signal processor, to allow position sensor 310 to detect fiducial marks within the camera's field of view. Control module 308 may store location information that position sensor 310 updates as position sensor 310 detects fiducial marks. As a result, position sensor 310 may utilize fiducial marks to maintain an accurate indication of the location mobile drive unit 204 and to aid in navigation when moving within workspace 208.

Holder sensor 312 represents one or more sensors, detectors, or other components suitable for detecting inventory holder 206 and/or determining, in any appropriate manner, the location of inventory holder 206, as an absolute location or as a position relative to mobile drive unit 204. Holder sensor 312 may be capable of detecting the location of a particular portion of inventory holder 206 or inventory holder 206 as a whole. Mobile drive unit 204 may then use the detected information for docking with or otherwise interacting with inventory holder 206.

Obstacle sensor 314 represents one or more sensors capable of detecting objects located in one or more different directions in which mobile drive unit 204 is capable of moving. Obstacle sensor 314 may utilize any appropriate components and techniques, including optical, radar, sonar, pressure-sensing and/or other types of detection devices appropriate to detect objects located in the direction of travel of mobile drive unit 204. In particular embodiments, obstacle sensor 314 may transmit information describing objects it detects to control module 308 to be used by control module 308 to identify obstacles and to take appropriate remedial actions to prevent mobile drive unit 204 from colliding with obstacles and/or other objects.

Obstacle sensor 314 may also detect signals transmitted by other mobile drive units 20 operating in the vicinity of the illustrated mobile drive unit 204. For example, in particular embodiments of inventory system 200, one or more mobile drive units 20 may include an identification signal transmitter 316 that transmits a drive identification signal. The drive identification signal indicates to other mobile drive units 20 that the object transmitting the drive identification signal is in fact a mobile drive unit. Identification signal transmitter 316 may be capable of transmitting infrared, ultraviolet, audio, visible light, radio, and/or other suitable signals that indicate to recipients that the transmitting device is a mobile drive unit 204.

Additionally, in particular embodiments, obstacle sensor 314 may also be capable of detecting state information transmitted by other mobile drive units 20. For example, in particular embodiments, identification signal transmitter 316 may be capable of including state information relating to mobile drive unit 204 in the transmitted identification signal. This state information may include, but is not limited to, the position, velocity, direction, and the braking capabilities of the transmitting mobile drive unit 204. In particular embodiments, mobile drive unit 204 may use the state information transmitted by other mobile drive units to avoid collisions when operating in close proximity with those other mobile drive units.

Control module 308 monitors and/or controls operation of drive module 304 and docking actuator 306. Control module 308 may also receive information from sensors such as position sensor 310 and holder sensor 312 and adjust the operation of drive module 304, docking actuator 306, and/or other components of mobile drive unit 204 based on this information. Additionally, in particular embodiments, mobile drive unit 204 may be configured to communicate with a management device of inventory system 200 and control module 308 may receive commands transmitted to mobile drive unit 204 and communicate information back to the management device utilizing appropriate communication components of mobile drive unit 204. Control module 308 may include any appropriate hardware and/or software suitable to provide the described functionality. In particular embodiments, control module 308 includes a general-purpose microprocessor programmed to provide the described functionality. Additionally, control module 308 may include all or portions of docking actuator 306, drive module 304, position sensor 310, and/or holder sensor 312, and/or share components with any of these elements of mobile drive unit 204.

In various embodiments, control module 308 can be or include all or part of the safety rated robotic motor (SSRM) control system. For example, the control module 308 can receive motor data associated with motor 106 from sensors 104 and process the motor data using programmable logic device 108 and/or safety controller 112. In some embodiments, and described further in reference to FIG. 5, the control module 308 may be partitioned to control different aspects of the mobile drive unit 204. For example, a first portion of the control module 308 may control safety critical components and a second portion of the control module 308 may control non-safety critical components.

Moreover, in particular embodiments, control module 308 may include hardware and software located in components that are physically distinct from the device that houses drive module 304, docking actuator 306, and/or the other components of mobile drive unit 204 described above. For example, in particular embodiments, each mobile drive unit 204 operating in inventory system 200 may be associated with a software process (referred to here as a "drive agent") operating on a server that is in communication with the device that houses drive module 304, docking actuator 306, and other appropriate components of mobile drive unit 204. This drive agent may be responsible for requesting and receiving tasks, requesting and receiving routes, transmitting state information associated with mobile drive unit 204, and/or otherwise interacting with management module 202 and other components of inventory system 200 on behalf of the device that physically houses drive module 304, docking actuator 306, and the other appropriate components of mobile drive unit 204. As a result, for the purposes of this description and the claims that follow, the term "mobile drive unit" includes software and/or hardware, such as agent processes, that provides the described functionality on behalf of mobile drive unit 204 but that may be located in physically distinct devices from the drive module 304, docking actuator 306, and/or the other components of mobile drive unit 204 described above.

Figure 5:
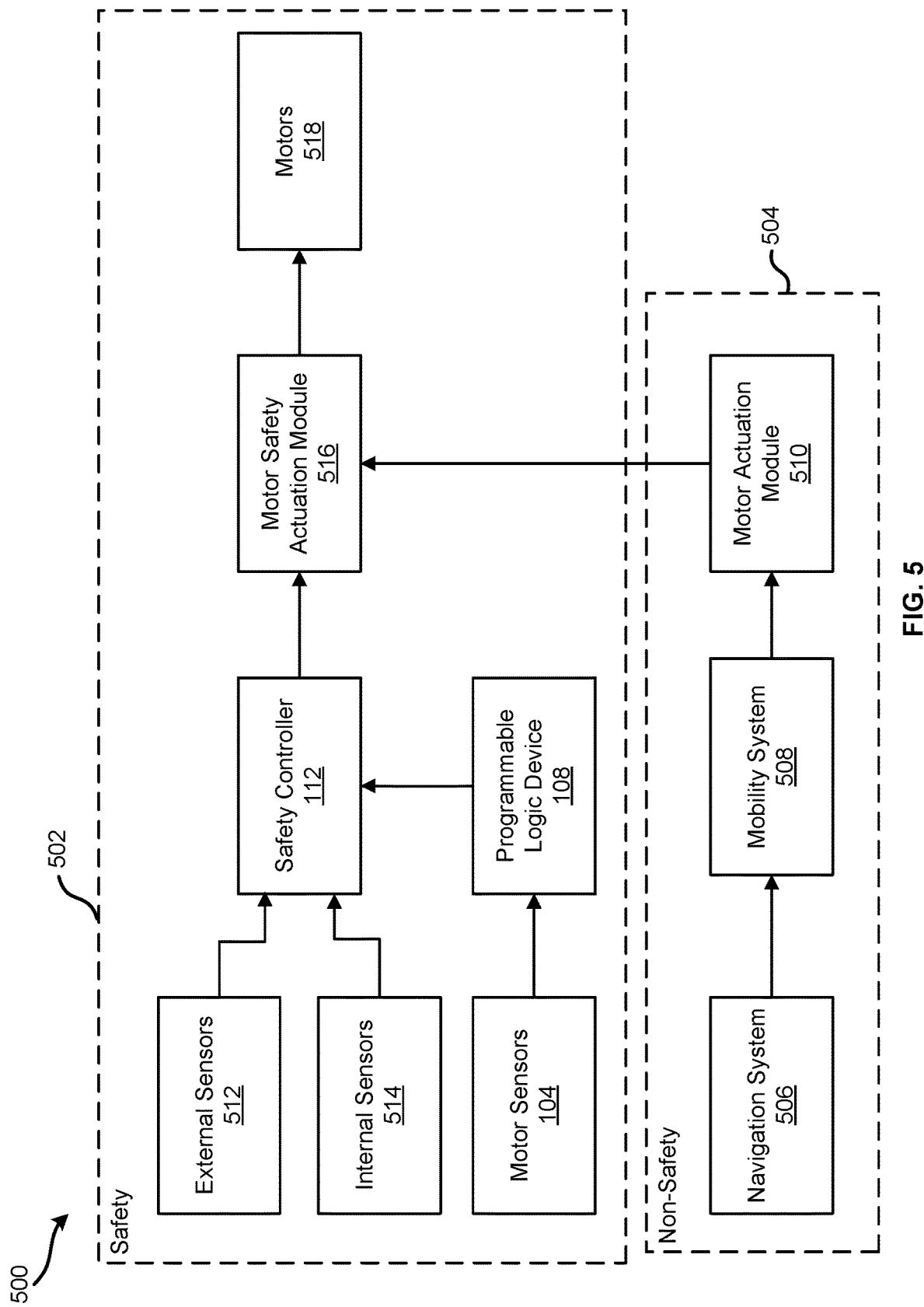
FIG. 5 illustrates an example data architecture including a safety rated robotic motor control system that may be utilized in particular embodiments of the mobile drive unit of FIGS. 3 and 4.

FIG. 5 illustrates an example data architecture 500 including a safety rated robotic motor (SRRM) control system that may be utilized in particular embodiments of the mobile drive unit of FIGS. 3 and 4, according to at least one embodiment. In various embodiments, some or all of the data architecture shown in FIG. 5 is included as part of the control module 308. The data architecture 500 can be partitioned, for example, having a safety portion 502 and a non-safety portion 504. The partitioned design of the safety architecture 500 can allow for multiple configurations while minimizing validation effort associated with adding variants. For example, the data architecture 500 having the safety portion 502 and the non-safety portion 504 can allow for a high-performance, complex, non-safety-certified autonomous navigation capability to operate the vehicle while relying on a separate, much simpler subsystem to ensure bystander safety.

The non-safety portion 504 can include one or more modules associated with the non-safety systems of the mobile drive unit 204. For example, the non-safety portion 504 can include a navigation system module 506, a mobility system module 508, and a motor actuation module 510. The navigation system module 506 can communicate with position sensor 310 to receive data associated with the position of the mobile drive unit 204 in the workspace 208. The mobility system module 508 can communicate with the management module 202 for route planning of the mobile drive unit. The motor actuation module 510 can generate operating instructions for the mobile drive unit 204 and communicate with the motor safety actuation module 516. The motor safety actuation module 516 can receive input from multiple sources (e.g., the motor actuation module 510, the safety controller 112, or any suitable module), and prioritize the safety-related operating instructions. In various embodiments, the modules 506, 508, 510 may communicate with any and/or all of the components of the mobile drive unit 204 and/or the management module 202.

In various embodiments, the non-safety portion 504 can be or include an autonomous navigation system that can navigate the mobile drive unit 204 around the workspace 208 using data from the management module 202. The non-safety portion 504 can use one or more of modules 506, 508, 510 to detect obstacles in the path of the mobile drive units 204 and perform rapid re-planning of its path and velocity profile to avoid those obstacles. The non-safety portion 504 may detect static obstacles (i.e., immobile obstacles in the path of the mobile drive units 204) and/or dynamic obstacles (i.e., moving obstacles that may enter the path of the mobile drive units 204). The non-safety portion 504 may include some safety architecture, however, the architecture may not be robust and deterministic enough to allow for safe operation of the mobile drive units 204.

The safety portion 502 can receive input from external sensors 512, internal sensors 514, and motor sensors 104. The external sensors 512 can include sensors positioned to detect data related to the workspace 208 and can communicate with the safety controller 112. The internal sensors 514 can include one or more emergency stop sensors (e.g., a sensor that can be activated to bring the mobile drive unit 204 to an immediate stop). In various embodiments, the emergency stop sensors can be or include a single-pole-dual-throw switch that the safety controller 112 can route a signal through. When the emergency stop sensors are activated, the safety controller 112 will not see the signal return and execute a safe torque off command to stop the mobile drive unit 204. The internal sensors 514 can additionally or alternatively be or include a SRBRS sensors (e.g., radio receivers that detect the presence of a SRBRS transmitter, for example, an SRBRS transmitter worn by a user located in the workspace 208), and/or encoders and communicate with the safety controller 112. The motor sensors 104 can communicate with the programmable logic device 108 and/or the safety controller 112 (e.g., the motor sensors 104 may communicate with the programmable logic device 108 which in turn communicates with the safety controller 112). The sensors 104, 512, 514 can communicate data related to obstacles and/or operation of the mobile drive unit 204. The safety controller 112 can receive the data and generate operating instructions for motors 518. The safety controller 112 can communicate with a motor safety actuation module 516. The motor safety actuation module 516 can receive data from the safety controller 112 and the motor actuation module 510. The motor safety actuation module 516 can override the non-safety actuation data in favor of the safety controller data to enable safe operation of the mobile drive unit 204. The motor safety actuation module 516 can make the determination of which data to send to the motors 518 to steer the mobile drive unit around the workspace 208. The motors 518 can be or include motor 106.

In various embodiments, the safety portion 502 can be used to perform various safety operations related to the mobile drive unit 204. For example, the safety portion 502 can have safety functions of safe limited speed, safe stop, safe operational stop, and safe torque off. The safe limited speed can be used when sensors (e.g., motor sensors 104, external sensors 512, or internal sensors 514) indicate a low speed is required. The safe stop can be used when sensors indicate the drive should stop immediately and/or when certain faults have been detected. The safe operational stop can be used to perform a powered and monitored stop. The safe torque off can be used to stop the mobile drive unit 204 when certain diagnostic failures occur and/or when an E-stop has been activated.

Figure 6:
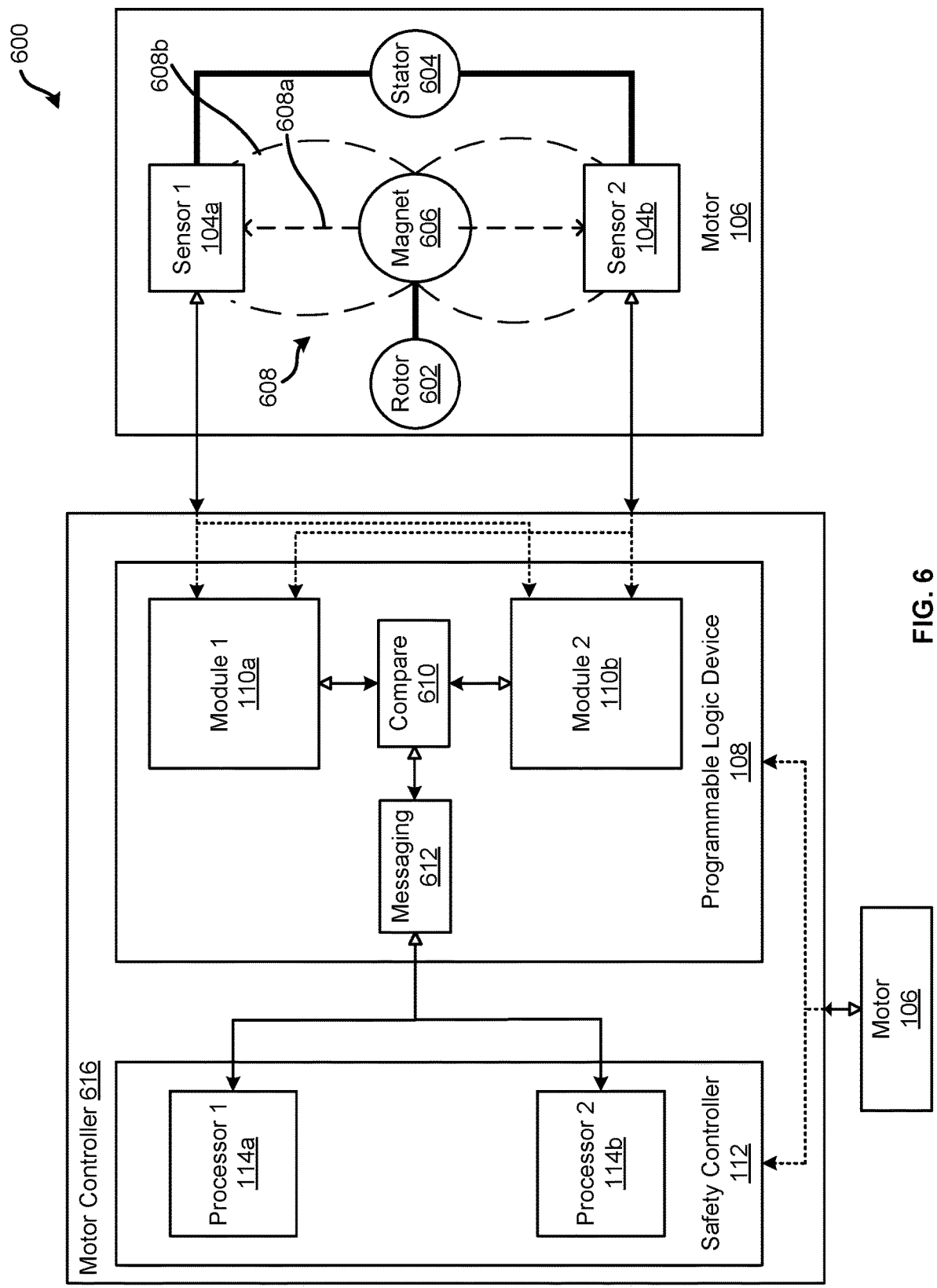
FIG. 6 illustrates an example of a detailed portion of the data architecture of FIG. 5, including a safety rated robotic motor control system, according to at least one embodiment.

FIG. 6 illustrates a detailed portion of the data architecture 500 including the safety rated robotic motor (SRRM) control system 600 for controlling one or more motors 106, according to at least one embodiment. The components of the SRRM control system 600 can be electrically connected with one another to send electrical signals and/or data. As shown in FIG. 6, a possible data path is indicated with dashed lines, a primary data path direction is indicated with a solid arrowhead, and a secondary data direction is indicated with an open arrowhead (i.e., the data primarily flows towards the direction indicated by the solid arrowhead, however, the data can flow towards the direction indicated by the open arrowhead). The SRRM control system 600 can include components and/or data architecture to be in compliance with IEC 61508 and ISO 13849 safety standards. In some embodiments, the SRRM control system 600 can include components and/or data architecture to be in compliance with IEC 61508 Safety Integrity Level 2 (e.g., the average frequency of a dangerous failure of the safety function [h−1] be $10^{-7}$ to $<10^{-6}$) and ISO 13849 redundant category 3 architecture (e.g., a single fault does not cause a loss of safety function). For example, the SRRM control system 600 can comply with the safety standards by using the programmable logic device 108 to detect a first set of faults (random and systematic) associated with the sensors 104 and using the safety controller 112 to detect any remaining faults or failure modes. The SRRM control system 600 can include a motor 106, a programmable logic device 108, and a safety controller 112. In some embodiments, the SRRM control system 600 can include additional and/or alternative components.

In various embodiments, the SRRM control system 600 can be or include one or more processors and a non-transitory computer-readable medium including processor-executable instruction. The functions of the SRRM control system 600 (or any other components discussed herein (e.g., components of data architecture 500)) can be implemented in the form of control logic in software or hardware or a combination of both. The control logic may be stored in an information storage medium as a plurality of instructions adapted to direct an information processing device to perform a set of steps disclosed in embodiments of the invention. Based on the disclosure and teachings provided herein, a person of ordinary skill in the art will appreciate other ways and/or methods to implement the features associated with the corresponding modules. As an example, functions described in this application may be implemented via programming logic controllers ("PLCs"), which may use any suitable PLC programming language. In other embodiments, the functions described in this application may be implemented as software code to be executed by one or more processors using any suitable computer language such as, for example, Java, C++ or Perl using, for example, conventional or object-oriented techniques. The software code may be stored as a series of instructions or commands on a non-transitory computer-readable medium, such as a random access memory ("RAM"), a read-only memory ("ROM"), a magnetic medium such as a hard-drive or a floppy disk, or an optical medium such as a CD-ROM. Any such computer-readable medium may also reside on or within a single computational apparatus, and may be present on or within different computational apparatuses within a system or network. Any of the entities described herein may be embodied by a computer that performs any or all of the functions and steps disclosed.

In various embodiments, the SRRM control system 600 can be or include a motor controller, for example, motor controller 616. The motor controller 616 can include the programmable logic device 108 and/or the safety controller 112 and can be connected (e.g., electrically connected) with motor 106.

The motor 106 can be part of drive module 304 and propel the mobile drive unit 204 around the workspace 208. The motor 106 can be or include a motor type that has a rotor 602 and a stator 604. A magnet 606 may be attached to the rotor 602 and rotated to generate a changing magnetic field 608. The sensors 104 can be positioned at various points on or about the motor 106 to measure data associated with the motor 106, for example, to measure the changing magnetic field 608. The sensors 104 may measure the radial magnetic field 608a and/or the tangential magnetic field 608b. The measured strength and/or orientation of the magnetic field 608 can correspond to the position of the rotor 602 relative to the sensors 104. In various embodiments, the sensors 104 can be or include encoders or any suitable type of sensor.

In various embodiments, the sensors 104 can be or include non-diverse (e.g., homogeneous) and/or non-safety rated sensors. For example, two hall effect sensors manufactured by a single manufacturer may be used. However, any suitable sensors 104 may be used. As shown in FIG. 6, the motor 106 includes two sensors 104, however, any suitable number of sensors may be used to measure the magnetic field 608. The sensors 104 can be or include hall effect sensors, optical sensors, switches, encoders, or any suitable sensor type. The sensors 104 can be in communication with the motor controller 616 to transmit the measured data. The communication between the sensors 104 and the motor controller 616 can occur using a standard serial peripheral interface (SPI) protocol. In various embodiments, the sensors 104 can be in communication with one or more components in the motor controller 616 (e.g., the programmable logic device 108 or the safety controller 112). For example, the sensors 104 can transmit the measured data to the programmable logic device 108. In some embodiments, the sensors 104 can transmit the measured data to the modules 110.

The programmable logic device 108 can receive the data (e.g., directly from sensors 104 and/or from the motor controller 616) and process the data received from the sensors 104. For example, the programmable logic device 108 can process the data to detect faults associated with the motor 106 and/or the sensors 104. The data received by the programmable logic device 108 can be or include motor positional data. The programmable logic device 108 can be or include a field programmable gate array (FPGA). The programmable logic device 108 can include one or more processing modules 110. The programmable logic device 108 shown in FIG. 6 includes two modules 110 (e.g., individually respectively identified as 110a and 110b), however, any suitable number of modules may be used. Each of the modules 110 may receive data from some or all of the sensors 104. For example, (and shown via dashed lines) the first sensor 104a can transmit the measured data to module 1 110a and module 2 110b and the second sensor 104b can transmit the measured data to module 1 110a and module 2 110b. The modules 110 can process the data received from the sensors 104. For example, the modules 110 can process the data to detect a first set of faults associated with the motor 106. The modules 110 can process the data to determine one or more of the angular position of the rotor 602, that the field strength of the magnetic field 608 is within upper and lower bounds, that the nonvolatile memory (NVM) parameters (e.g., memory retained between power cycles) match certified-safe values, and/or that the rotor 602 is not stuck. The modules 110 may additionally or alternatively determine if there is corruption of the drive motor, that the partition between the safety and non-safety portions of the data architecture 500 is intact, and/or that stator 604 is functioning. If any of the determined values falls outside of an acceptable range, the modules can generate a fault message associated with the motor 106. The fault message can include the faults determined by the modules 110 or, if no faults are detected, the fault message can include data that no faults were detected. The fault message can be transmitted from the modules 110 to the compare block 610 and/or the messaging block 612.

In embodiments where the programmable logic device 108 includes multiple modules 110, the fault message of each of the modules 110 can be compared to one another by compare block 610. The compare block 610 can compare the fault messages from each module 110 to one another to prevent a single logic failure from leading to erroneous sensor data. If the fault messages of the modules 110 agree with one another, the compare block 610 can generate a fault status that includes the fault messages. The compare block 610 can send the fault status to messaging block 612 for transmission to components in the motor controller 616. If the fault messages generated by the modules 110 disagree with one another, the compare block 610 can generate a fault status that includes the disagreement between the modules 110 and send the fault status to the messaging block 612. In various embodiments, when the safety controller 112 receives a fault status from the messaging block 612 that includes the disagreement, the safety controller 112 can generate operating instructions for the motor 106 that include a safe torque off command. The safety controller 112 can send the safe torque off command to the motor 106 to stop rotation of the motor 106.

The messaging block 612 can receive the fault status from the modules 110 and/or the compare block 610 and read, check, and/or package the data contained in the fault status for transmission to the safety controller 112. The messaging block 612 can also receive the data from the sensors 104 to package and send the data to the safety controller 112. In various embodiments, the messaging block 612 packages the data for communication over a CAN bus protocol (e.g., a CAN FD bus). The CAN bus protocol can be the same as or similar to Ethernet or USB. In some embodiments, some or all of the data can further include black channel reliability, for example, through a 24 Bit cyclic redundancy check (CRC) using a custom dataset. The CRC can be or include a set of bits typically appended onto the end of a message. The messages can include a semi-unique CRC value. A receiver can receive a packet with an attached CRC and check that the CRC matches the data in the packet. If the CRC and the packet don't match, the receiver can identify the data that has a bit error and can throw the packet out and/or send instructions to the transmitter to repeat the transmission.

The messaging block 612 can communicate with the safety controller 112 to transmit the fault status and the sensor data. The messaging block 612 can transmit the fault status and the sensor data to one or more processors contained in the safety controller 112. For example, the messaging block 612 can send the fault status and the sensor data to each of the first and second processors 114a, 114b. Each of the processors 114 can process the sensor data, for example, to determine a second set of faults associated with the motor 106. The second set of faults can additionally include that no faults have been associated with the motor 106/. In some embodiments, determining the second set of faults can include performing processes that were performed by the modules 110 of the programmable logic device 108. For example, the second set of faults can include determining the angular position of the rotor 602 relative to the sensors 104. In various embodiments, the processors 114 can process the sensor data to determine one or more of the angular position of the rotor 602 relative to the sensors 104, the phase offset between the sensors 104, the velocity of the motor 106, the angle offset between the sensors, the time difference between the current data received and the previous data received, a difference between a first time base associated with a first motor 106 and a second time base associated with a second motor 106 (e.g., to confirm there is no drift between the time bases of the different motors 106 over time), and/or data associated with the motor 106.

The processors 114 can each send the second set of faults to compare block 610. For example, the processors 114 can send the second set of faults to messaging block 612 which sends the second set of faults to compare block 610. The compare block 610 can compare the second set of faults processed by the processors 114 and generate a second fault status based on the compared second set of faults. For example, if the second set of faults received from the processors 114 agree with one another, the compare block 610 can generate a second fault status that includes the agreement (e.g., the agreed on fault or the agreed on no-fault found). If the second set of faults disagree with one another, the compare block 610 can generate a second fault status that includes the disagreement (e.g., the second fault status can include data that indicates the processors disagree on the fault and a safe torque off command should be generated). The compare block 610 can transmit the second fault status to the safety controller 112 via the messaging block 612. The safety controller 112 can generate operating instructions for the motor 106 based on the second fault message and/or the fault message received from the programmable logic device 108. The operating instructions can be or include instructions to aid in steering the mobile drive unit 204 around the workspace 208.

In various embodiments, the SRRM control system 600 can include multiple motors 106. FIG. 6 includes two motors 106, however, three, four, five, six, or any suitable number of motors 106 can be included in the SRRM control system 600. In various embodiments, the motors 106 can transmit data to the safety controller 616. For example, each of the motors 106 can send sensor data associated with sensors 104 positioned on the respective motors 106. The data can be sent to the programmable logic device 108 and/or the safety controller 112 to generate fault statuses associated with each motor 106. The fault statuses associated with each of the motors 106 can be compared (e.g., using compare block 610). For example, the compare block 610 can compare a first time base associated with a first motor 106 and a second time base associated with a second motor 106 to confirm there is no drift between the time bases of the different motors 106 over time, The compared fault statuses and the sensor data associated with the motors 106 can be used by the safety controller 112 to generate operating instructions for one or more of the motors 106. For example, if the fault status of one of the motors 106 indicates a fault, the safety controller 112 can generate a safe torque off command for both motors 106.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
  a mobile drive unit comprising a motorized wheel to propel the mobile drive unit, first and second sensors, and a motor having a rotor and a magnet, the motor coupled to the motorized wheel to control movements of the mobile drive unit around a warehouse environment comprising inventory holders, and the first and second sensors attached to the motor and configured to measure data associated with the magnet, the first and second sensors being homogeneous non-safety rated sensors;
  a programmable logic device in communication with the first and second sensors and comprising first and second modules, each of the first and second modules configured to:
    receive, from the first and second sensors, first and second data associated with the motor;
    process the first and second data, the processing of the first and second data comprising determining a first set of characteristics associated with the motor; and
    generate a fault status comprising the first set of characteristics,
    wherein the programmable logic device is configured to compare first and second fault statuses from the respective first and second modules and generate a fault message based on the compared first and second fault statuses;
  a safety controller comprising first and second processors, each of the first and second processors in communication with the programmable logic device and configured to:
    receive, from the programmable logic device, the fault message and the first and second data associated with the motor;

process the first and second data, the processing of the first and second data comprising determining a second set of characteristics associated with the motor;

generate an output based on the second set of characteristics, wherein the safety controller is configured to compare first and second outputs from the respective first and second processors and generate operating instructions based on the compared first and second outputs and the fault message, the operating instructions comprising data associated with the operation of the motor to control movements via the wheel of the mobile drive unit within the warehouse environment; and a motor safety actuation controller configured to:
receive the operating instructions from the safety controller and navigating instructions from a non-safety subsystem;
prioritize the operating instructions from the safety controller that are based on the compared first and second outputs of the safety controller and the fault message from the programmable logic device; and
actuate, based on the prioritizing, the motor to safely guide the mobile drive unit while lifting an inventory holder and/or around the inventory holders within the warehouse environment.

2. The system of claim 1, wherein the first set of characteristics comprises:
an angular orientation of the rotor relative to the first and second sensors;
a strength of a magnetic field generated by the magnet; and
an orientation of the magnetic field relative to the first and second sensors.

3. The system of claim 1, wherein the second set of characteristics comprises:
a rate of rotation of the rotor; and
an offset angle between the first and second sensors.

4. The system of claim 1, wherein the first and second sensors are homogeneous non-safety rated motor encoders.

5. A computer-implemented method, comprising:
receiving, from first and second sensors positioned on a motor coupled to a motorized wheel to control movements of a mobile drive unit, first and second data associated with the motor, the first and second data received by a programmable logic device, the first and second sensors being homogeneous non-safety rated sensors;
processing, using first and second modules of the programmable logic device, the first and second data by determining a first set of characteristics associated with the motor;
generating, using a comparison module of the programmable logic device, a fault status by comparing the first set of characteristics processed by the first module with the first set of characteristics processed by the second module;
receiving, from the programmable logic device, the first and second data associated with the motor and the fault status, the data received by a safety controller;
processing, using a first processor and a second processor of the safety controller, the first and second data of the safety controller by determining a second set of characteristics associated with the motor, each of the first and second processors processing the first and second data to determine the second set of characteristics associated with the motor;
generating, using the safety controller, operating instructions based on the fault status and by comparing the second set of characteristics determined by the first processor with the second set of characteristics determined by the second processor, the operating instructions configured to control movements of the mobile drive unit within the warehouse environment;
receiving, using a motor safety actuation controller, the operating instructions from the safety controller and navigating instructions for guiding the mobile drive unit within the warehouse environment from a non-safety subsystem;
prioritize, using a motor safety actuation controller, the operating instructions from the safety controller that are based on the compared first and second outputs of the safety controller and the fault message from the programmable logic device; and
actuate, based on the prioritizing, the motor to safely guide the mobile drive unit while lifting an inventory holder and/or around the inventory holders within the warehouse environment.

6. The computer-implemented method of claim 5, wherein determining the first set of characteristics associated with the motor comprises determining at least one of:
an angular orientation of a rotor of the motor relative to the first and second sensors;
a field strength of a magnetic field generated by a magnet positioned on the rotor; or
an orientation of the magnetic field relative to the first and second sensors.

7. The computer-implemented method of claim 6, wherein determining the second set of characteristics associated with the motor comprises determining at least one of:
angular orientation of the rotor of the motor relative to the first and second sensors;
a field strength of the magnetic field generated by a magnet positioned on the rotor;
an orientation of the magnetic field relative to the first and second sensors;
a rate of rotation of the rotor; or
an offset angle between the first and second sensors.

8. The computer-implemented method of claim 5, wherein generating operating instructions comprises generating a safe torque off command to the motor if the fault status contains a fault or the second set of characteristics processed by the first processor disagrees with the second set of characteristics processed by the second processor.

9. The computer-implemented method of claim 5, further comprising, transmitting the fault status from the programmable logic device to the safety controller using a protected channel message.

10. The computer-implemented method of claim 5, wherein the first and second data comprises at least one of a strength of a magnetic field generated in the motor or an orientation of the magnetic field generated in the motor.

11. The computer-implemented method of claim 5, wherein the first and second sensors are of the same type and are manufactured to the same specifications.

12. A motor controller, comprising:
a programmable logic device comprising first and second modules and configured for communication with first and second sensors that are positioned on a motor comprising a motorized wheel to propel a mobile drive unit, the first and second sensors being homogeneous non-safety rated sensors, each of the first and second modules configured to:

receive, from the first and second sensors, first and second data associated with the motor; and process the first and second data, the processing of the first and second data comprising determining a first set of characteristics associated with the motor, wherein the programmable logic device is configured to generate a fault status responsive to comparing the first set of characteristics processed by the first module with the first set of characteristics processed by the second module; and a safety controller comprising first and second processors, each of the first and second processors in communication with the programmable logic device and configured to:

receive, from the programmable logic device, the fault status and the first and second data associated with the motor; and process the first and second data, the processing of the first and second data comprising determining a second set of characteristics associated with the motor, wherein the safety controller is configured to generate operating instructions based on the fault status and comparing the second set of characteristics processed by the first processor with the second set of characteristics processed by the second processor, the operating instructions comprising data associated with the operation of the motor to control movements via the wheel of the mobile drive unit within the warehouse environment; and a motor safety actuation controller configured to:

receive the operating instructions from the safety controller and navigating instructions from a non-safety subsystem;

prioritize the operating instructions from the safety controller that are based on the compared first and second outputs of the safety controller and the fault message from the programmable logic device; and actuate, based on the prioritizing, the motor to safely guide the mobile drive unit while lifting an inventory holder and/or around the inventory holders within the warehouse environment.

13. The motor controller of claim 12, wherein the motor controller is positionable on the mobile drive unit positioned in a warehouse environment.

14. The motor controller of claim 12, wherein determining the second set of characteristics associated with the motor comprises verifying the first set of characteristics using the first and second data.

15. The motor controller of claim 12, wherein the fault status is a first fault status and the motor controller is further configured to receive a second fault status associated with a second motor and generating the operating instructions is based on the first fault status, the second fault status, and comparing the second set of characteristics processed by the first processor with the second set of characteristics processed by the second processor.

16. The motor controller of claim 15, wherein determining the first set of characteristics associated with the motor comprises determining:

an angular orientation of a rotor of the motor relative to the first and second sensors;

a strength of a magnetic field generated by a magnet positioned on the rotor; or an orientation of the magnetic field relative to the first and second sensors.

17. The motor controller of claim 16, wherein determining the second set of characteristics associated with the motor comprises determining:

a rate of rotation of the rotor;

a difference between a first time base associated with the motor and a second time base associated with the second motor; or an offset angle between the first and second sensors.

18. The motor controller of claim 12, wherein the safety controller can receive data associated with an autonomous navigation system and generating the operating instructions further comprises comparing the fault status and the comparing of the second set of characteristics processed by the first processor with the second set of characteristics processed by the second processor with the data associated with the autonomous navigation system.

19. The motor controller of claim 18, wherein the operating instructions prioritize the fault status and the comparing of the second set of characteristics processed by the first processor with the second set of characteristics processed by the second processor over the data associated with the autonomous navigation system.

* * * * *